H. STRONG.
TURBINE PUMP.
APPLICATION FILED SEPT. 25, 1920.

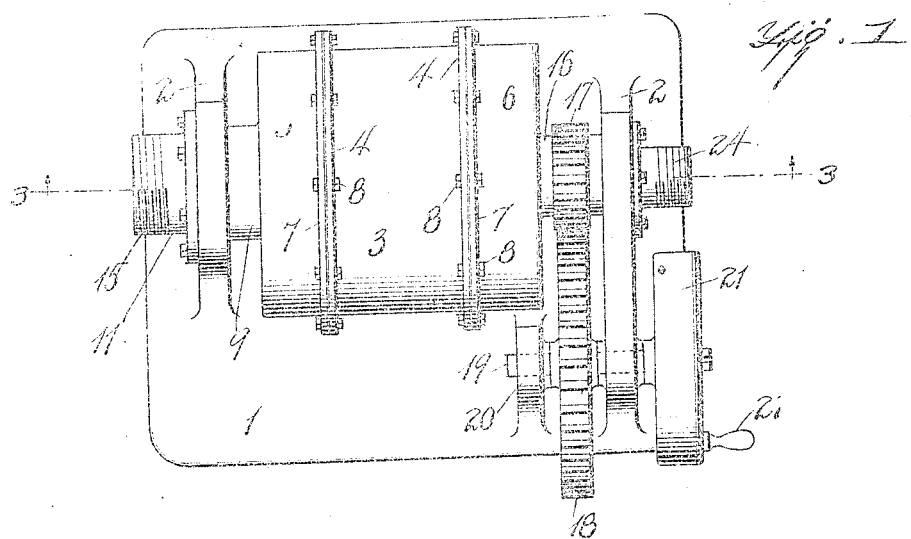
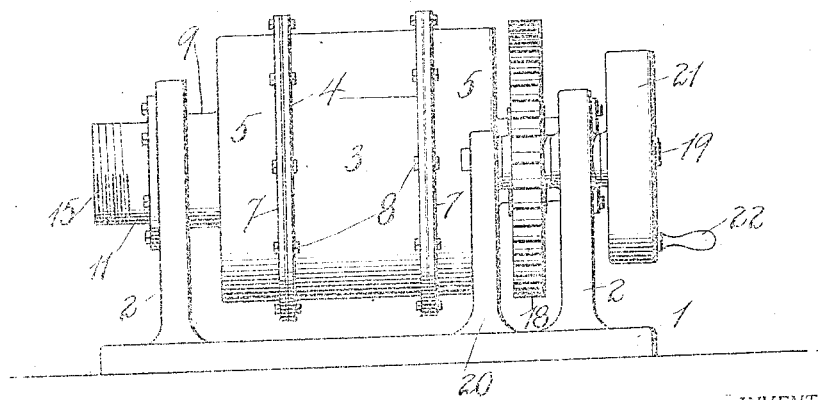

1,372,786.

Patented Mar. 29, 1921.
2 SHEETS—SHEET 2.

INVENTOR.
HENRY STRONG,
BY
Franklin H. Hough
ATTORNEY.

UNITED STATES PATENT OFFICE.

HENRY STRONG, OF MILLINOCKET, MAINE.

TURBINE-PUMP.

1,372,786.　　　　Specification of Letters Patent.　　Patented Mar. 29, 1921.

Application filed September 25, 1920. Serial No. 412,640.

*To all whom it may concern:*

Be it known that I, HENRY STRONG, a citizen of the United States, residing at Millinocket, in the county of Penobscot and State of Maine, have invented certain new and useful Improvements in Turbine-Pumps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel construction of turbine pump, which is simple of construction and thoroughly efficient in use.

In the drawings:

Figure 1 is a view in top plan of the turbine pump of my invention;

Fig. 2 is a view in side elevation thereof;

Figure 3:
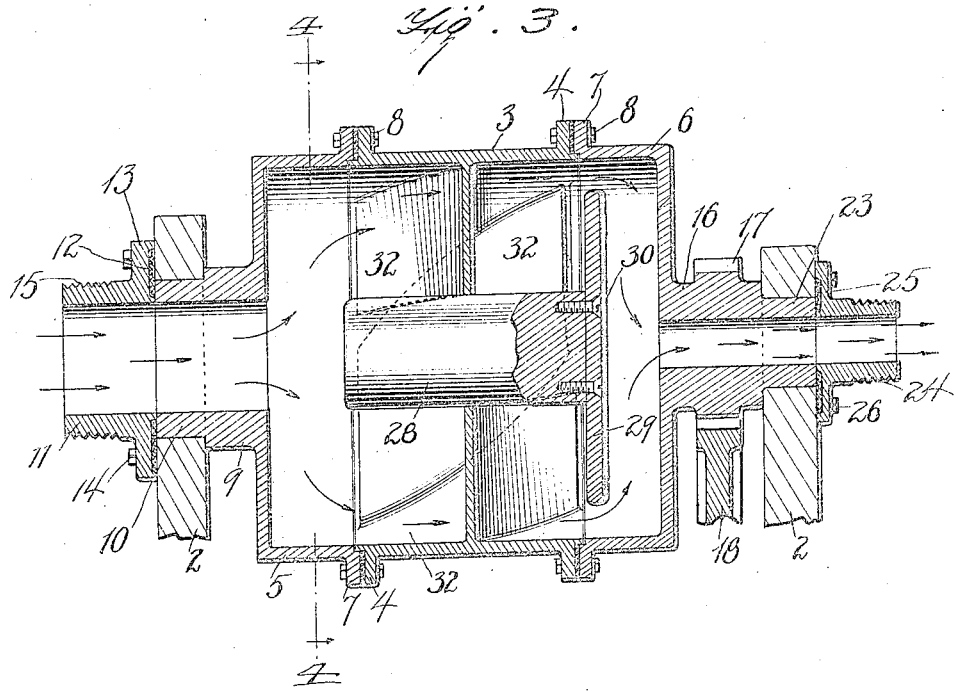
Fig. 3 is a view in longitudinal section on the line 3—3 of Fig. 1.
Figure 4:
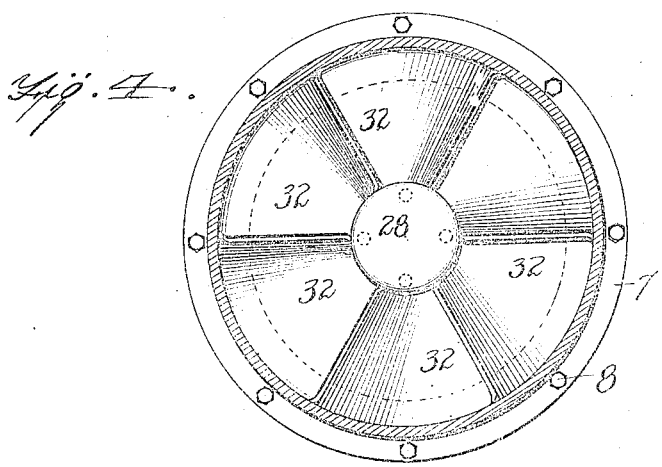
Fig. 4 is a view along the line 4—4 of Fig. 3 looking in the direction of the arrows.

In detail:

1 designates a base, of any suitable construction, for supporting the operative parts of the pump. Rising from the base are standards 2, 2, in which the rotatable pump body is journaled.

The pump body comprises an open-ended cylindrical member 3 having lateral circumferential flanges 4, 4 and end caps 5 and 6, likewise having lateral flanges 7 through which, and through the flanges 4, securing means, such as bolts 8, may pass for holding the cylindrical body 3 and said end caps 5 and 6 in assembled relation.

The cap 5 is provided with an axial hollow hub 9 having a reduced portion 10 journaled in the frame 2.

A pipe coupling 11 is disposed against the end of the hub 10 and a suitable packing 12 is interposed between said pipe coupling and the adjacent end of the hub and the standard 2, so as to make a water tight joint at this point. The coupling 11 is provided with a circumferential lateral flange 13 suitably secured to the standard 2, as by means of bolts 14. The coupling is also exteriorly screw-threaded, as shown at 15, for engagement with a pipe leading from a source of water supply.

The coupling 6 is likewise provided with an axial hub 16 suitably journaled in the adjacent standard 2, and carries a gear 17, meshing with a second gear 18 on a shaft 19 rotatably supported in the standard 2, and in a standard 20 rising from the base 1. On the end of the shaft 19 is a wheel 21, which may be rotated by means of a crank handle 22, whereby the turbine pump body 3 may be manually rotated. It will be understood, however, that the gearing wheel 21 and crank 22 are merely exemplary of one form of means for rotating the pump body, since other means may be used, and, as a matter of fact, the pump body may be actuated by power means.

The hub 16 has a reduced portion 23 journaled in the standard 2.

A pipe coupling 24 is adapted to be disposed against the end of the hub portion 23, and a suitable packing 25 is interposed between said coupling and the adjacent end of the hub and the standard 2. Bolts 26, passing through a circumferential lateral flange 27 on the coupling 24, secure the latter to the standard 2.

Disposed interiorly and concentrically of the cylindrical body 3 is a solid core 28, preferably cylindrical, and carrying laterally a disk 29 of larger diameter than said core. Preferably, the disk 29 is secured to the core by means of screws 30. The disk 29 is of somewhat less diameter than the cylinder 3, so that a passageway is formed between the perimeter of the disk and the inner circumferential surface of the cylinder 3, as shown in Fig. 3.

Between the cylinder 3 and the core 28 are turbine or screw blades 32 suitably secured to said cylinder and core.

A flexible hose may be attached to the coupling 24.

In operation, the wheel 21 is turned by the crank 27, thus rotating the shaft 19 and the gears 18 and 17, thereby revolving the pump body 3 and the turbine blades 32, the water consequently being drawn and forced through said turbine body 3 and through the hub 16 and the coupling 24.

What I claim to be new is:

1. A turbine pump comprising a cylindrical open-ended body, end caps secured to said body and each having a hub, supporting means within which said hubs are rotatably journaled, a solid core disposed axially within said cylindrical member and carrying a disk of lesser diameter than said cylindrical member, and turbine blades between said cylindrical member and said core.

2. The turbine pump as specified in claim 1, and means geared to one of said hubs for rotating said cylindrical body.

In testimony whereof I hereunto affix my signature.

HENRY STRONG.